(12) United States Patent
Sengodan et al.

(10) Patent No.: US 12,218,580 B2
(45) Date of Patent: Feb. 4, 2025

(54) SURGE PROTECTION AND FAILSAFE CIRCUIT FOR DC-DC CONVERTER

(71) Applicant: Hamilton Sundstrand Corporation, Charlotte, NC (US)

(72) Inventors: Rajkumar Sengodan, TamilNadu (IN); Ann Freida F, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/455,089

(22) Filed: Aug. 24, 2023

(65) Prior Publication Data
US 2025/0007391 A1    Jan. 2, 2025

(30) Foreign Application Priority Data
Jun. 28, 2023  (IN) .............................. 202311043328

(51) Int. Cl.
| | | |
|---|---|---|
| H02M 1/32 | (2007.01) | |
| H02J 3/38 | (2006.01) | |
| H02M 1/44 | (2007.01) | |
| H02M 3/158 | (2006.01) | |

(52) U.S. Cl.
CPC ............. *H02M 1/325* (2021.05); *H02J 3/381* (2013.01); *H02M 1/44* (2013.01); *H02M 3/158* (2013.01); *H02J 2310/44* (2020.01)

(58) Field of Classification Search
CPC ........ H02M 1/32; H02M 1/1325; H02M 1/44; H02M 3/158; H02J 3/38; H02J 3/381; H02J 2310/44
See application file for complete search history.

(56) References Cited

U.S. PATENT DOCUMENTS

| | | |
|---|---|---|
| 7,821,750 B2 | 10/2010 | Chu et al. |
| 8,422,179 B2 | 4/2013 | Zhan et al. |
| 8,705,253 B2 | 4/2014 | Roman |
| 10,086,711 B2 | 10/2018 | Kawamura et al. |
| 10,355,594 B2 | 7/2019 | Nakashima et al. |
| 10,886,846 B2 | 1/2021 | Liu et al. |
| 11,277,003 B2 | 3/2022 | Marcinkiewicz |
| 11,349,398 B2 | 5/2022 | Balakrishnan et al. |
| 11,482,922 B2 | 10/2022 | Boncato |

*Primary Examiner* — Robert L Deberadinis
(74) *Attorney, Agent, or Firm* — CANTOR COLBURN LLP (57) ABSTRACT

A Direct Current (DC)-DC converter includes an input capacitor connected across a positive input terminal and a return input terminal. A DC-DC converter circuit is connected across the positive input terminal and the return input terminal. A current limiting failsafe circuit includes a current limiting portion connected across the positive input terminal and the return input terminal and a failsafe portion connected to a sensed voltage output. The failsafe portion is configured to control a current limit function of the current limiting portion and configured to force the DC-DC converter circuit into an off state in response to retripping of the current limiting portion.

18 Claims, 5 Drawing Sheets

Table 1

| Working Logic | COMPARATOR | COMPARATOR | XOR | MOSFET | MOSFET |
|---|---|---|---|---|---|
| | 464 | 462 | 466 | 401 | 412 |
| Normal Operation | 0 | 0 | 0 | Off | On |
| Overcurrent Detect | 1 | 0 | 1 | On | Off |
| Initiate Normal Operation | 1 | 1 | 0 | Off | On |

FIG. 7

Table 2

| Overcurrent Occurrence | XOR | D-Flip Flop | D-Flip Flop | D-Flip Flop | AND | M1_gate |
|---|---|---|---|---|---|---|
| | 466 | 474 | 476 | 478 | 472 | |
| S1 | 1 | 0 | 1 | 0 | Off | Momentary Off |
| S2 | 1 | 1 | 0 | 0 | Off | Momentary Off |
| S3 | 1 | 0 | 0 | 0 | Off | Momentary Off |
| S4 | 1 | 1 | 1 | 1 | On | Permanent Off |

FIG. 8

SURGE PROTECTION AND FAILSAFE CIRCUIT FOR DC-DC CONVERTER

CROSS-REFERENCE TO RELATED APPLICATIONS

This application claims the benefit of Indian Provisional Patent Application No. 202311043328 filed Jun. 28, 2023, the disclosure of which is incorporated herein by reference in its entirety.

BACKGROUND

The subject disclosure relates to aircraft power distribution systems, and more specifically to a direct current (DC)-DC converter design including surge protection and failsafe circuitry.

Commercial and military aircraft typically include one or more electrical generators to convert excess rotational power from the aircraft engines into electrical power that is then utilized to power various electrical systems throughout the aircraft. In other examples, aircraft can use electrical power storages (e.g., batteries, super capacitors, and the like) to store electrical power from a power source on the ground, for use during a flight.

In a typical aircraft the power is distributed from the power source to the multiple electrical systems using a DC power distribution system, and the DC power received at each electrical system is converted to the DC voltage/power levels that are required by that electrical system. When power is initially applied to the power distribution system in such examples, the DC-DC converters are subjected to an inrush current which can exceed a rated surge current recommendation. Repeated exposure to such surge currents can damage the internal characteristics of capacitors within a DC-DC converter, and decrease the lifespan of the DC-DC converter.

BRIEF DESCRIPTION

In one exemplary embodiment a Direct Current (DC)-DC converter including an input capacitor connected across a positive input terminal and a return input terminal, a DC-DC converter circuit connected across the positive input terminal and the return input terminal, a current limiting failsafe circuit including a current limiting portion connected across the positive input terminal and the return input terminal, and a failsafe portion connected to a sensed voltage output, the failsafe portion being configured to control a current limit function of the current limiting portion and configured to force the DC-DC converter circuit into an off state in response to retripping of the current limiting portion.

In addition to one or more of the features described herein the sensed voltage output is a sensed voltage across one of an EMI filter inductor and a transistor within the current limiting failsafe circuit.

In addition to one or more of the features described herein the failsafe portion comprises a voltage monitoring circuit having an input connected to the sensed voltage output, and an output connected to a first logic comparator and a second logic comparator, each of the logic comparators configured to receive a distinct reference voltage, and wherein a first output of the first logic comparator and a second output of the second logic comparator are connected to inputs of a first XOR gate.

In addition to one or more of the features described herein an output of the first XOR gate is configured to control an operational state of the current limiting portion such that a positive output of the XOR gate turns the current limiting portion on.

In addition to one or more of the features described herein the current limiting portion includes a first current limiting resistor connecting the input terminal to a node, a second current limiting resistor connecting the node to the return terminal, a current limiting capacitor connecting the node to the return terminal, and a transistor connecting the return terminal to a return terminal connection of the input capacitor, wherein an on/off state of the transistor is configured to be controlled at least partially via the output of the XOR gate.

In addition to one or more of the features described herein the current limiting portion includes a solid state switch connecting the input terminal to the return terminal and an EMI filter, and wherein an on/off state of the solid state switch is controlled at least partially via the first XOR gate.

In addition to one or more of the features described herein the failsafe circuit further comprises an event counting portion, wherein the event counting portion includes a plurality of logical operators providing an output to a second XOR gate, the output of the first XOR gate is configured to be provided as an input to the second XOR gate, and an output of the second XOR gate is configured to provide the on/off control of the current limiting portion.

In addition to one or more of the features described herein the plurality of logical operators includes a plurality of sequentially arranged D-flip flops and an AND gate, with each D-flip flop being configured to provide an output to a next D-flip flop in the sequence and as an input to the AND gate, and wherein an output of the AND gate is an input to the second XOR gate.

In addition to one or more of the features described herein the plurality of sequentially arranged D-flip flops includes three sequentially arranged D-flip-flops.

In another exemplary embodiment an aircraft power distribution system includes at least one engine mounted electric generator configure to convert rotational energy within the engine to electrical energy, a power distribution controller configured to receive the electrical energy from the electric generator, convert the electrical energy to direct current (DC) energy, provide the DC energy to multiple electric subsystems within the aircraft, wherein at least one of the electric subsystems is configured to convert the received DC power to a different DC voltage and current using a DC-DC converter, and wherein the DC-DC converter comprises a current limiting failsafe circuit including a current limiting portion connected across the positive input terminal and the return input terminal, and a failsafe portion connected to a sensed voltage output, the failsafe portion being configured to control a current limit function of the current limiting portion and configured to force the DC-DC converter circuit into an off state in response to retripping of the current limiting portion.

In addition to one or more of the features described herein the sensed voltage output is a sensed voltage across one of an EMI filter inductor and a transistor within the current limiting failsafe circuit.

In addition to one or more of the features described herein the failsafe portion comprises a voltage monitoring circuit having an input connected to the sensed voltage output, and an output connected to a first logic comparator and a second logic comparator, each of the logic comparators being configured to receive a distinct reference voltage, and wherein a first output of the first logic comparator and a second output of the second logic comparator are connected to inputs of a first XOR gate.

In addition to one or more of the features described herein an output of the first XOR gate is configured to control an operational state of the current limiting portion such that a positive output of the XOR gate turns the current limiting portion on.

In addition to one or more of the features described herein the current limiting portion includes a first current limiting resistor connecting the input terminal to a node, a second current limiting resistor connecting the node to the return terminal, a current limiting capacitor connecting the node to the return terminal, and a transistor connecting the return terminal to a return terminal connection of the input capacitor, wherein an on/off state of the transistor is configured to be controlled at least partially via the output of the XOR gate.

In addition to one or more of the features described herein the current limiting portion includes a solid state switch connecting the input terminal to the return terminal and an EMI filter, and wherein an on/off state of the solid state switch is configured to be controlled at least partially via the first XOR gate.

In addition to one or more of the features described herein the failsafe circuit further comprises an event counting portion, the event counting portion including a plurality of logical operators providing an output to a second XOR gate, the output of the first XOR gate is provided as an input to the second XOR gate, and an output of the second XOR gate is configured to provide the on/off control of the current limiting portion.

In addition to one or more of the features described herein the plurality of logical operators includes a plurality of sequentially arranged D-flip flops and an AND gate, with each D-flip flop being configured to provide an output to a next D-flip flop in the sequence and as an input to the AND gate, and wherein an output of the AND gate is an input to the second XOR gate.

In addition to one or more of the features described herein the plurality of sequentially arranged D-flip flops includes three sequentially arranged D-flip-flops.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings and tables in which.

DETAILED DESCRIPTION

Figure 1:
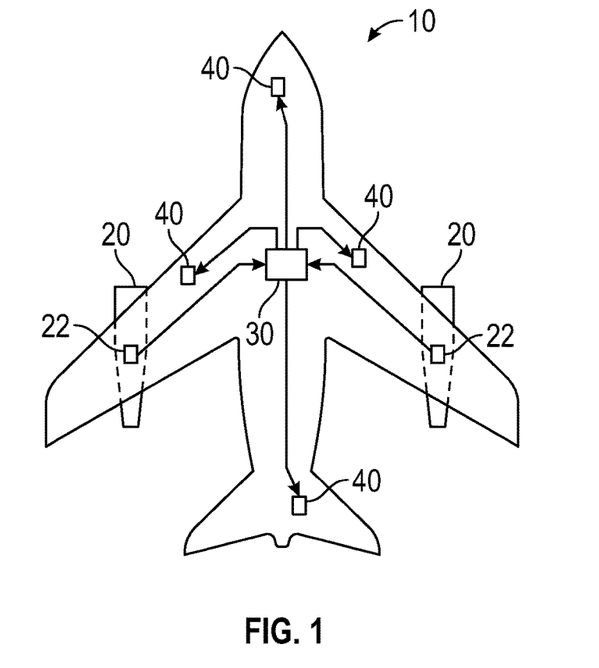
FIG. 1 schematically represents a high level aircraft power distribution system.

FIG. 1 illustrates an aircraft 10, including two wing mounted engines 20. Each engine 20 includes a generator 22 configured to convert rotation from within the engine 20 into electricity. Typically, due to the rotation of the engine 20 and the type of generator 22 utilized, the electricity is provided in the form of alternating current (AC). The alternating current is provided to a power distribution system 30, which converts the power to DC using a converter. The power distribution system 30 distributes the DC power to multiple electrical systems 40 distributed throughout the aircraft 10, and electrical system 40 utilizes the received power for operations. The illustrated number and positions of the electrical system 40 is exemplary and is not representative of a particularly physical configuration.

Due to the diverse nature and function of the electrical systems 40 different voltages and power levels of DC power may be required at different electrical systems 40. To accommodate these variations, electrical systems 40 that require power at a different voltage or power level than provided by the power distribution system 30 incorporate DC-DC converters which receive the power and convert it to voltage and power levels required by the electrical system 40.

Figure 2:
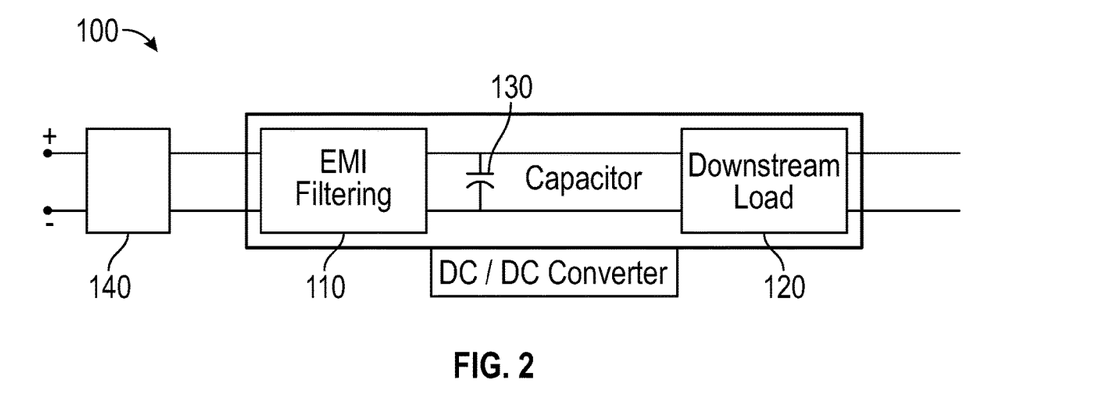
FIG. 2 schematically illustrates a DC-DC converter.

With continued reference to FIG. 1, FIG. 2 illustrates one such example DC-DC converter 100, The DC-DC converter 100 includes a conventional electromagnetic interference (EMI) filtering portion 110 connected to a downstream load 120 (such as a flyback converter, or any other type of DC-DC conversion circuit) via a capacitor 130. In alternate configurations, the capacitor 130 can be in front of the EMI filtering portion 110 without altering the performance or operations of the DC-DC converter 100. In some examples, the capacitor 130 is a tantalum capacitor, which is typically constructed of a pellet of porous tantalum metal as an anode, covered by an insulating oxide layer that forms the dielectric, surrounded by liquid or solid electrolyte as a cathode. Due to the very thin and relatively high permittivity dielectric layer, tantalum capacitors having a high capacitance per volume and a lower weight than other types of capacitors. In other examples, any capacitor type that functions similarly to a tantalum capacitor and has a similar or higher capacitance per volume could be utilized to similar effect.

Figure 3:
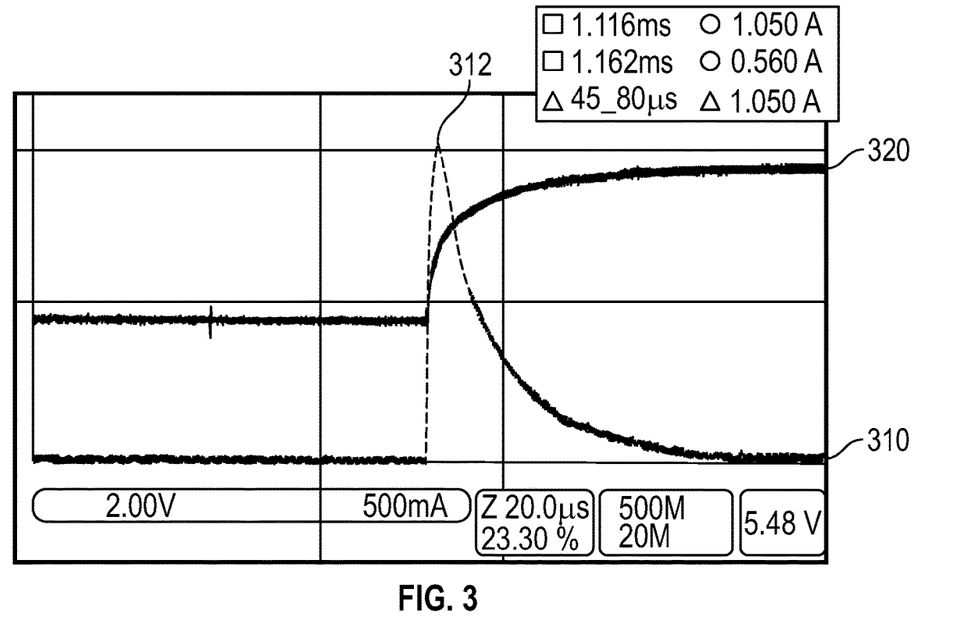
FIG. 3 is a chart illustrating an inrush current characteristic of the DC-DC converter of FIG. 2.

In a typical system the capacitor 130 is positioned to ensure that there are no voltage drops to the downstream load 120. However, certain types of capacitors, such as tantalum capacitors, are susceptible to oxidization during inrush currents due to the chemical characteristics of the constituent materials. Oxidization can degrade performance and eventually lead to a short circuit event, thereby shortening the lifespan of the converter. With reference to FIGS. 1 and 2, FIG. 3 illustrates a typical surge current 310 at the capacitor 130 when the voltage source is initially turned on (e.g., when power is initially provided to the DC-DC converter 100). As voltage is initially applied at a time 102, a current spike 312 occurs, and quickly decays. The spike 312 is the inrush current.

Figure 4:
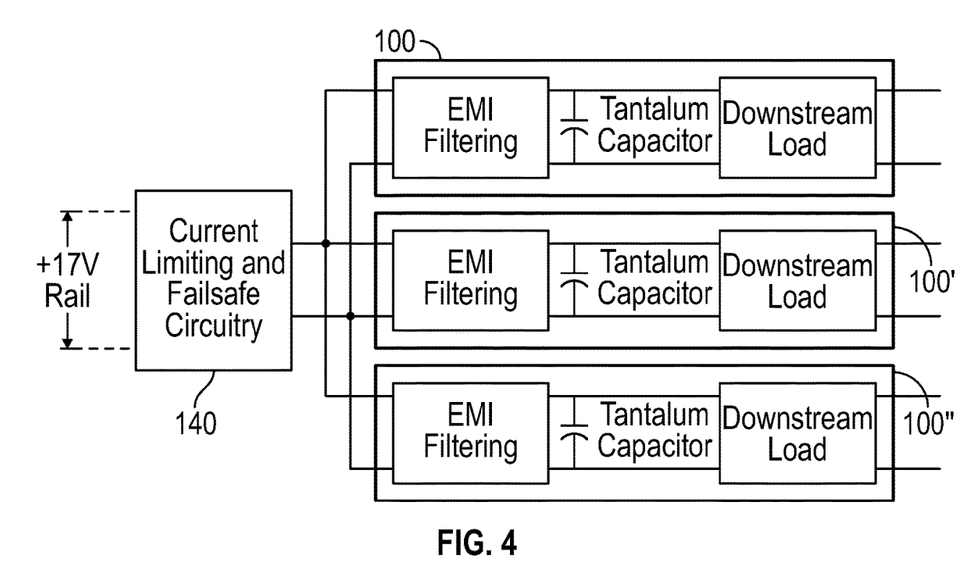
FIG. 4. Schematically illustrates a current limiting failsafe circuit connection to multiple DC-DC converters.

In order to reduce, or eliminate, the possibility of an inrush current that exceeds the rated surge current of the capacitor 130, a current limiting failsafe circuit 140 is connected the DC-DC converter 100. FIG. 4 illustrates an alternate example configuration where the single current limiting failsafe circuit 140 is connected to multiple identical, or similar, DC-DC converters 100, 100', 100". The current limiting fail safe circuit 140 provides two primary functions. First, the current limiting failsafe circuit 140 limits the current during a surge condition via a current limiting circuit. Second, the current limiting failsafe circuit 140 provides a failsafe capability by constantly monitoring the voltage and shutting down the system to prevent the system from entering into an unstable state during an extended overcurrent event.

With continued reference to FIGS. 1-4, FIGS. 5 and 6 illustrate example current limiting failsafe circuits 440, 540 that can be utilized in the configurations of FIG. 2 and FIG. 4. In both cases, the circuits 440, 540 can be generalized as two functioning portions, a current limiting portion 402, 502, and a failsafe portion 450, 550. The failsafe portion 450, 550 is the same between the examples of FIG. 5 and FIG. 6, with variation in what the source of the current limiting voltage measurements are and what switch is utilized to disable the DC-DC converter 100. Operationally, the failsafe portion 450, 550 function identically.

Figure 5:
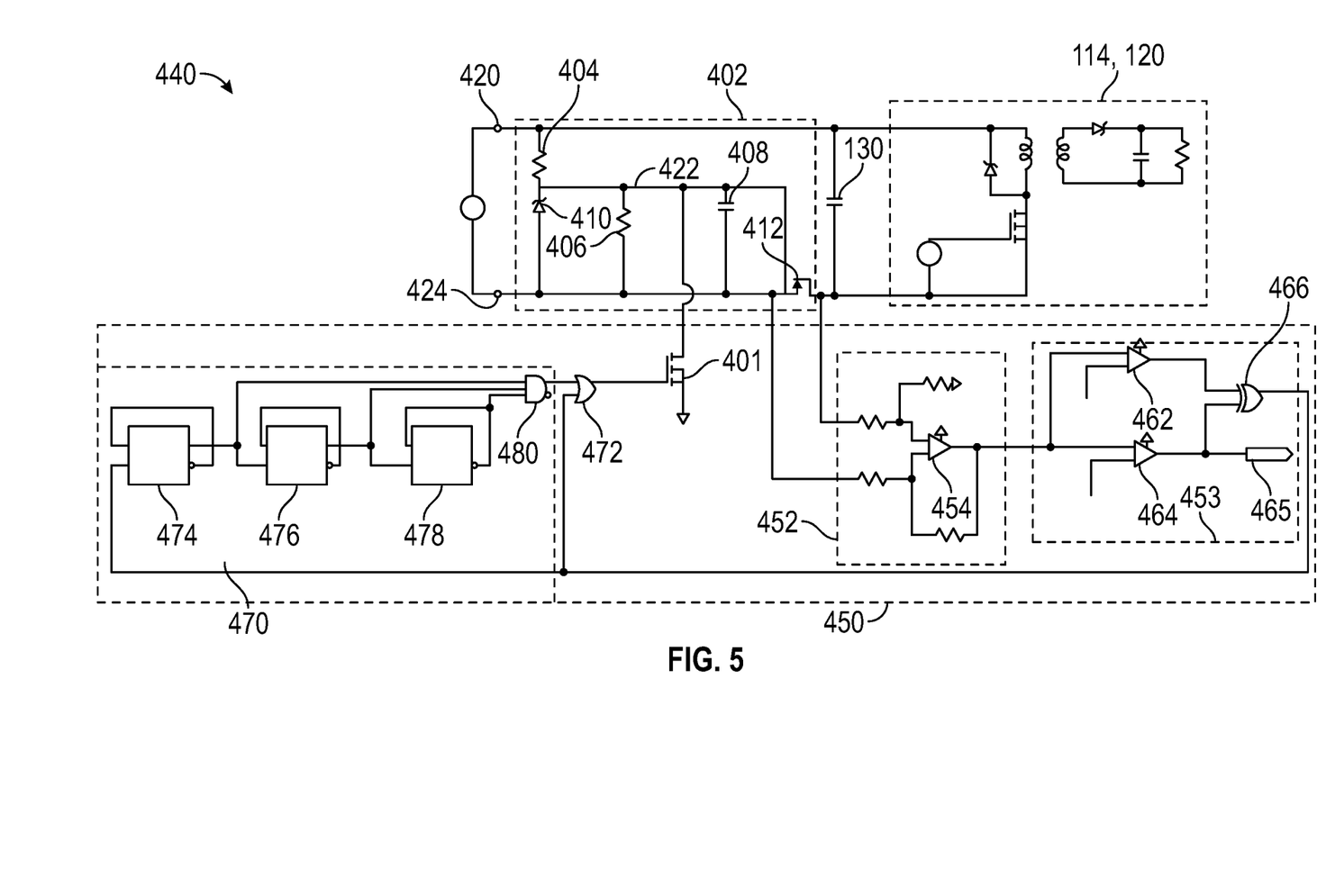
FIG. 5 schematically illustrates a circuit diagram of a current limiting failsafe circuit applied to a single DC-DC converter using a first current limiting configuration.

With regards to the current limiting failsafe circuit 440 of FIG. 5, the circuit 440 includes a current limiting section 402 having a pair of current limiting resistors 404, 406, a capacitor 408, and a Zener diode 410. The first resistor 404 is connected to a positive voltage terminal 420 at one end, and to a first node 422 at the second end. The second resistor 406 is connected to the first node 422 at a first end, and to a return terminal 424 at a second end. The Zener diode 410 is connected across the node 422 and the return terminal 424 in parallel to the second resistor 406, and the capacitor 408 is connected across the node 422 and the return terminal 424 in parallel to the second resistor 406. The DC-DC converter portion begins with the capacitor 130 as the input capacitor placed across the positive voltage terminal 420 and the return terminal 424. A transistor 412 connects an output of the return terminal to the return terminal of the capacitor 130 and controls the operation of the DC-DC converter 110, 120, 130. The operation of the components in this configuration provides a current limit that shunts current from the positive terminal 402 to the return terminal 404 when a current at the positive terminal 402 exceeds a threshold value.

Figure 6:
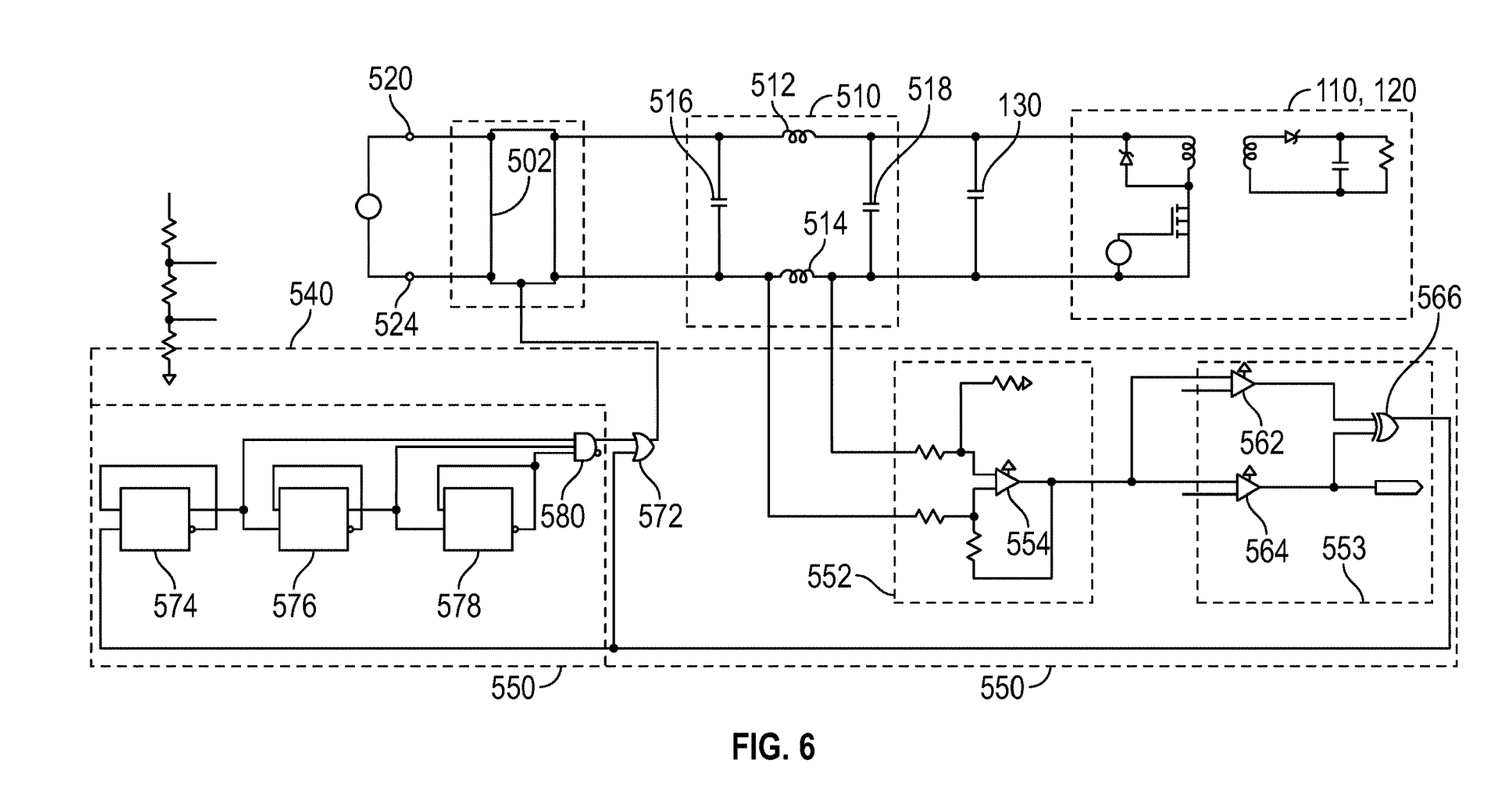
FIG. 6 schematically illustrates a circuit diagram of a current limiting failsafe circuit applied to a single DC-DC converter using a second current limiting configuration.

In contrast, the current limiting failsafe circuit 540 of FIG. 6 utilizes a solid state switch 502 constructed of an N-channel or P-channel enhancement mode metal oxide semiconductor field effect transistor (MOSFET). The MOSFET is operated in a cut-off (alternately referred to as saturation) region during standard operations.

The solid state switch 502 is connected across the terminals of a common mode choke 510 which filters out common mode noise. The common mode choke 510 includes inductors 512, 514 on each of the positive terminal and the return terminal, and capacitors 516, 518. In addition to filtering, the inductors 512, 514 are utilized to sense the current through, and voltage across the inductors 512, 514 and the sensed voltages are provided to the failsafe portion 550. When an overcurrent is detected across the inductors 512, 514, the failsafe circuit 550 opens the solid state switch, allowing the current to pass through the switch 502 without passing through the DC-DC inverter portion 110, 120, 130.

Turning to the failsafe circuit 450, 550, the failsafe circuits 450, 550 include a voltage monitoring circuit 452, 552. The voltage monitoring circuit 452, 552 includes an operational amplifier 454, 554 configured to sense the difference in voltage across transistor 412 in the case of FIG. 5 and across the inductors 512, 514 in the case of FIG. 6. The output of the operational amplifier 454, 554 is provided to logic comparators 462, 464, 562, 564 each of which compares the incoming voltage from the operational amplifier 454, 554 to a corresponding reference voltage, and a positive value is output from the comparator 462, 464, 562, 564 when the output of the operational amplifier 454 is positive. The outputs of the comparators 464, 462, 562, 564 are provided to an exclusive OR (XOR) gate 466, 566. The XOR gate 466, 566 outputs high when one of the comparators 464, 462, 562, 564 output is high.

The output of the XOR gate 466, 566 is provided to one input of a first OR gate 472, 572. The exclusive XOR gate 466, 566 provides a logic output high, or logic output low, based on the changes in the inputs received. The output of the first OR gate 472, 572 is provided to a switch 401, 502. Thus, whenever the output of the XOR gate 466, 566 is high, indicating the presence of an overcurrent, the OR gate 472, 572 drives the corresponding switch 401, 502 closed, shunting the current and completing the feedback loop.

In addition to the voltage monitoring circuit 452, 552 and the comparison portion 453, 553, the failsafe circuit 450, 550 includes an event counting portion 470, 570. The event counting portion 470, 570 includes three sequentially arranged D-flip flops 474, 476, 478, 574, 576, 578 and an AND gate 480, 580. The sequentially arranged D-flip flops 474, 476, 478, 574, 576, 578 and the AND gate 480, 580 combine to provide an overcurrent counting logic, that outputs a positive (high) output from the AND gate 480, 580 to the OR gate 472, 572 when the number of overcurrent events has exceeded a threshold number. This output causes the OR gate 472, 572 to provide a high signal to the corresponding switch 401, 502 regardless of the output of the monitoring circuit 452, 552 and the comparison portion 453, 553, and the switch 401, 502 is maintained in a closed (shunting) state until the D-flip flops 474, 476 478, 574, 576, 578 are reset.

Referring now to the example of FIG. 5 specifically, when a voltage is applied across the positive terminal 420 and the return terminal 422, the capacitor 130 begins charging as current passes through the resistors 404, 406. As the charge in the capacitor 130 builds up, a voltage begins to build across the capacitor 130 and the current limiting circuit MOSFET 412 sequences through four states. The first state is an off state, during the initial power up. The second state is operation in the linear region during the current liming mode. The third state is operation in a saturation region, during standard operations. The fourth state is a cut-off mode of operations, when the fail safe indicates that the DC-DC converter is to be shut down.

During the off state, the MOSFET 412 is initially off, and the drain to source voltage is high. The charge time and turn-on of the MOSFET 412 are slowed by the capacitance of the capacitor 408. The resistances and capacitance of the resistors 404, 406 and capacitor 408 are chosen to allow the input capacitors 130 to charge slowly, thereby limiting the inrush current and such that the MOSFET 412 operates in a linear mode during the start-up. During a fresh inrush period, the voltage across the MOSFET 412 results in a large voltage difference between the return lead of the source and the input return of the DC-DC converter. The gate to source voltage of the MOSFET 412 increases gradually and the drain to source voltage decreases while the drain current begins to increase. During this mode, the MOSFET 412 sees a high voltage and a high current, resulting in a large amount of power dissipation, and the MOSFET 412 operates as a constant current sink.

Once the MOSFET 412 enters saturation mode, the circuit transitions to the normal mode of operations, with the MOSFET 412 being fully on and conducting a steady state current with a low drain-to-source voltage drop across the MOSFET 412.

Referring to the failsafe circuit of both examples, during the event of a power surge, the failsafe portion 450, 550 monitors the voltage across the MOSFET 412 or the inductor 514 and feeds a control signal back to the input and provides for a safe shut down of the DC-DC converter 100 system. The voltage monitoring circuit compares the voltage signal across the MOSFET 412, or the inductor 514, against a set reference voltage defined by the reference voltages being provided as inputs to the comparators 462, 464, 562, 564 with the comparator 464, 564 providing a "set" logic, and comparator 462, 562 providing a "reset" logic. The reference voltages are provided from a corresponding controller using any standard configuration.

When the voltage output from the voltage monitoring circuit 452, 552 is greater than the reference voltage at the reset comparator 462, 562 and less than the reference signal at the set comparator 464, 564, the reset comparator 462, 562 outputs a high signal and the output of the set comparator 464, 564 is a low signal.

When the voltage output from the voltage monitoring circuit 452, 552 is greater than the reference signal at the comparator 462, 562, and greater than the reference signal at the reset comparator 464, 564, both the set comparator 462, 562 and the reset comparator 462, 562 output high. In some examples, the output of the set comparator 464, 564 can also be passed as a "fault flag" 465, 565 to a controller for fault detection tracking and monitoring.

The output state of the XOR gate 466, 566 depends on the inputs from the set gate 464, 564 and the reset gate 462, 562, and drives the shunt transistor 401 through the or gate 480, 580. In addition, the output state of the XOR gate 466, 566 is fed to the overcurrent event count logic 470, 570, which monitors for consecutive excessive currents.

Figure 7:
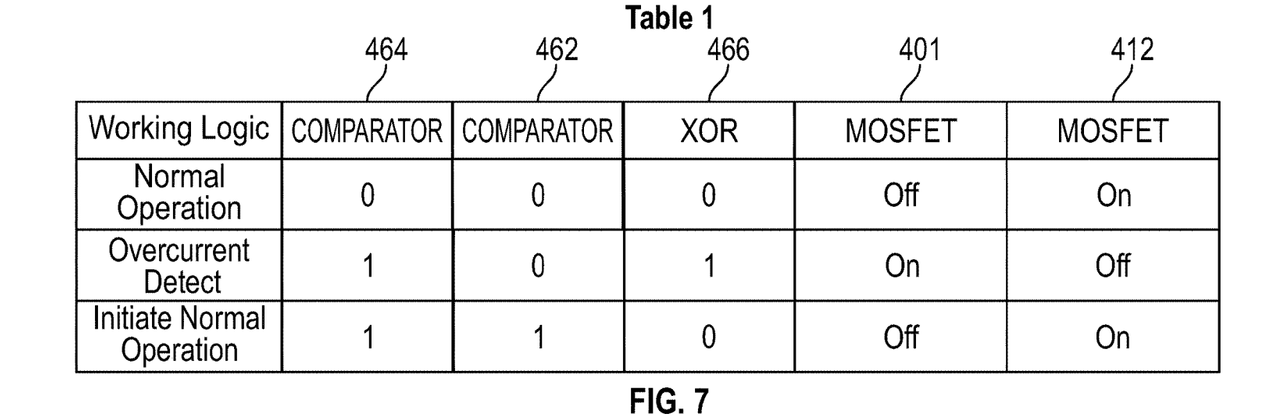
FIG. 7 illustrates TABLE 1 which shows an operation of the overcurrent detection portion of a failsafe circuit of either FIG. 5 or FIG. 6.

Table 1 illustrates the logic progression with regards to the circuit of FIG. 5 and provides for a momentary shut-down for the duration of an inrush current. Each column indicates the logical output of the component listed in the heading. During operation of the circuit when the voltage across MOSFET 412 is higher than the threshold voltage provided to the OR gate 462, the circuit pulls the gate voltage of MOSFET 412 to ground, turning the MOSFET 412 off (open). This places the DC-DC converter in a momentary shutdown mode and brings the circuit to a safe operating region.

After this, the capacitor 408 begins charging through the current limiting resistors 404, 406 which turns the transistor 412 back on, thus the restart time for the system after a momentary shutdown is dependent on the resistances of the current limiting resistors 404, 406 and on the charging time of the capacitor 408.

Figure 8:
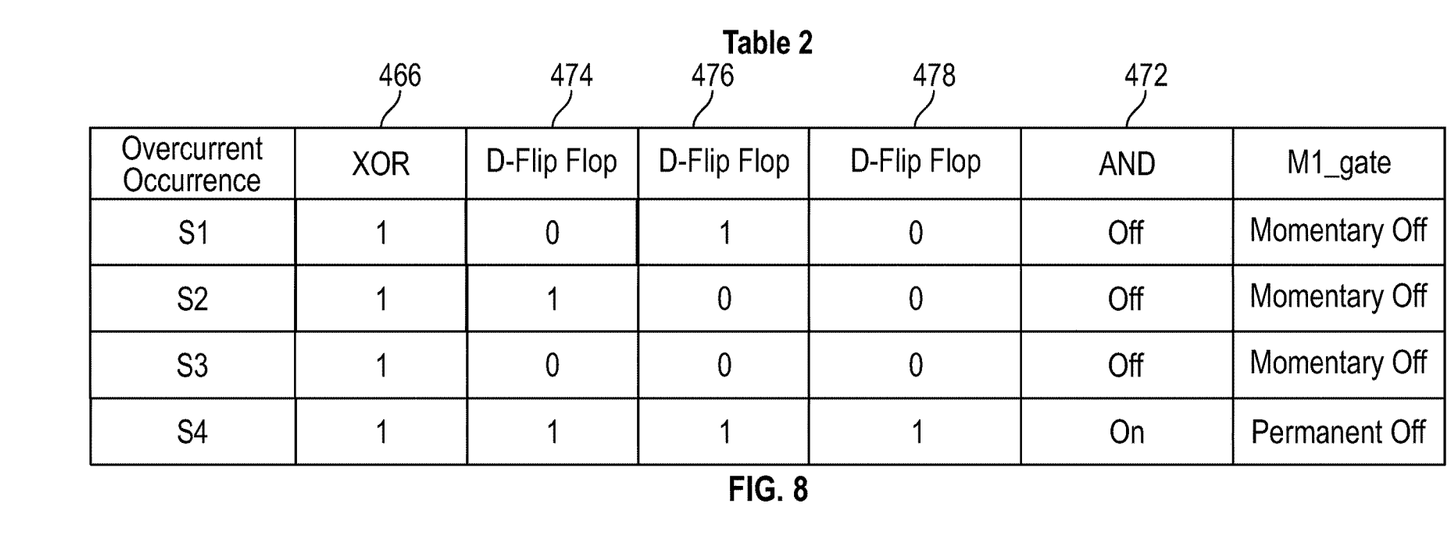
FIG. 8 illustrates TABLE 2 which shows an operation of the failsafe portion of the failsafe circuit of either FIG. 5 or FIG. 6.

Table 2 shows the logical progression described with regards to the failsafe circuit 450 for counting overcurrent events, and for enforcing a permanent shut down of the DC-DC converter until the logic is reset. Each row of the table is a sequential tick of the clock period, and each column is the logical output of the component in the heading for that tick, with the XOR gate 466 providing a high output for the entire duration. The number of sequential ticks required to reach the permanently off state can be configured by a circuit designer and is set to be longer than an expected duration of inrush currents, thereby ensuring that the permanent off state is only entered during a fault. In the illustrated configuration, the D-flip-Flops 474, 476, 478 count the duration of the overcurrent which enables a permanent shutdown when the duration exceeds the designed length. The exemplary duration is set at four consecutive detections of an overcurrent, but can be configured. In an alternate configuration, the D-flip flops and the AND gate 472 can be implemented in a microcontroller, computer processor, or similar structure.

While the operations of the failsafe circuit 450 of FIG. 5 are discussed above, it is appreciated that the failsafe circuit 550 of FIG. 6 operate in the same manner, and a detailed breakdown of the identical operations is unnecessary.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A Direct Current (DC)-DC converter comprising:
   an input capacitor connected across a positive input terminal and a return input terminal;
   a DC-DC converter circuit connected across the positive input terminal and the return input terminal;
   a current limiting failsafe circuit including a current limiting portion connected across the positive input terminal and the return input terminal, and a failsafe portion connected to a sensed voltage output, the failsafe portion being configured to control a current limit function of the current limiting portion and configured to force the DC-DC converter circuit into an off state in response to retripping of the current limiting portion.

2. The DC-DC converter of claim 1, wherein the sensed voltage output is a sensed voltage across one of an EMI filter inductor and a transistor within the current limiting failsafe circuit.

3. The DC-DC converter of claim 1, wherein the failsafe portion comprises a voltage monitoring circuit having an input connected to the sensed voltage output, and an output connected to a first logic comparator and a second logic comparator, each of the logic comparators is configured to receive a distinct reference voltage, and wherein a first output of the first logic comparator and a second output of the second logic comparator are connected to inputs of a first XOR gate.

4. The DC-DC converter of claim 3, wherein an output of the first XOR gate is configured to control an operational state of the current limiting portion such that a positive output of the XOR gate turns the current limiting portion on.

5. The DC-DC converter of claim 4, wherein the current limiting portion includes a first current limiting resistor connecting the input terminal to a node, a second current limiting resistor connecting the node to the return terminal, a current limiting capacitor connecting the node to the return terminal, and a transistor connecting the return terminal to a return terminal connection of the input capacitor, wherein an on/off state of the transistor is configured to be controlled at least partially via the output of the XOR gate.

6. The DC-DC converter of claim 4, wherein the current limiting portion includes a solid state switch connecting the input terminal to the return terminal and an EMI filter, and wherein an on/off state of the solid state switch is configured to be controlled at least partially via the first XOR gate.

7. The DC-DC converter of claim 4, wherein the failsafe circuit further comprises an event counting portion, wherein the event counting portion includes a plurality of logical operators configured to provide an output to a second XOR gate, the output of the first XOR gate is configured to be provided as an input to the second XOR gate, and an output of the second XOR gate is configured to provide the on/off control of the current limiting portion.

8. The DC-DC converter of claim 7, wherein the plurality of logical operators includes a plurality of sequentially arranged D-flip flops and an AND gate, with each D-flip flop providing an output to a next D-flip flop in the sequence and as an input to the AND gate, and wherein an output of the AND gate is an input to the second XOR gate.

9. The DC-DC converter of claim 8, wherein the plurality of sequentially arranged D-flip flops includes three sequentially arranged D-flip-flops.

10. An aircraft power distribution system comprising:
at least one engine mounted electric generator configured to convert rotational energy within the engine to electrical energy;
a power distribution controller configured to receive the electrical energy from the electric generator, convert the electrical energy to direct current (DC) energy, provide the DC energy to multiple electric subsystems within the aircraft, wherein at least one of the electric subsystems is configured to convert the received DC power to a different DC voltage and current using a DC-DC converter; and
wherein the DC-DC converter comprises a current limiting failsafe circuit including a current limiting portion connected across the positive input terminal and the return input terminal, and a failsafe portion connected to a sensed voltage output, the failsafe portion being configured to control a current limit function of the current limiting portion and configured to force the DC-DC converter circuit into an off state in response to repeated retripping of the current limiting portion.

11. The aircraft power distribution system of claim 10, wherein the sensed voltage output is a sensed voltage across one of an EMI filter inductor and a transistor within the current limiting failsafe circuit.

12. The aircraft power distribution system of claim 10, wherein the failsafe portion comprises a voltage monitoring circuit having an input connected to the sensed voltage output, and an output connected to a first logic comparator and a second logic comparator, each of the logic comparators being configured to receive a distinct reference voltage, and wherein a first output of the first logic comparator and a second output of the second logic comparator are connected to inputs of a first XOR gate.

13. The aircraft power distribution system of claim 12, wherein an output of the first XOR gate controls an operational state of the current limiting portion such that a positive output of the XOR gate is configured to turn the current limiting portion on.

14. The aircraft power distribution system of claim 13, wherein the current limiting portion includes a first current limiting resistor connecting the input terminal to a node, a second current limiting resistor connecting the node to the return terminal, a current limiting capacitor connecting the node to the return terminal, and a transistor connecting the return terminal to a return terminal connection of the input capacitor, wherein an on/off state of the transistor is configured to be controlled at least partially via the output of the XOR gate.

15. The aircraft power distribution system of claim 14, wherein the current limiting portion includes a solid state switch connecting the input terminal to the return terminal and an EMI filter, and wherein an on/off state of the solid state switch is configured to be controlled at least partially via the first XOR gate.

16. The aircraft power distribution system of claim 13, wherein the failsafe circuit further comprises an event counting portion comprises a plurality of logical operators providing an output to a second XOR gate, the output of the first XOR gate is configured to be provided as an input to the second XOR gate, and an output of the second XOR gate is configured to provide the on/off control of the current limiting portion.

17. The aircraft power distribution system of claim 16, wherein the plurality of logical operators includes a plurality of sequentially arranged D-flip flops and an AND gate, with each D-flip flop being configured to provide an output to a next D-flip flop in the sequence and as an input to the AND gate, and wherein an output of the AND gate is an input to the second XOR gate.

18. The aircraft power distribution system of claim 17, wherein the plurality of sequentially arranged D-flip flops includes three sequentially arranged D-flip-flops.

* * * * *